(12) United States Patent
An et al.

(10) Patent No.: US 11,468,540 B2
(45) Date of Patent: Oct. 11, 2022

(54) METHOD AND DEVICE FOR IMAGE PROCESSING

(71) Applicant: LG ELECTRONICS INC., Seoul (KR)

(72) Inventors: Jaehyun An, Yongin-si (KR); Jiwon Lee, Seoul (KR); Dongkyu Lee, Seoul (KR); Aram Kim, Seoul (KR); Jingyeong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 263 days.

(21) Appl. No.: 16/828,636

(22) Filed: Mar. 24, 2020

(65) Prior Publication Data

US 2021/0150660 A1 May 20, 2021

(30) Foreign Application Priority Data

Nov. 14, 2019 (KR) .................... 10-2019-0145803

(51) Int. Cl.
| | |
|---|---|
| *G06T 1/20* | (2006.01) |
| *G06T 7/00* | (2017.01) |
| *G06N 3/08* | (2006.01) |
| *G06N 20/00* | (2019.01) |
| *G06F 17/18* | (2006.01) |

(52) U.S. Cl.
CPC ............. *G06T 1/20* (2013.01); *G06F 17/18* (2013.01); *G06N 3/08* (2013.01); *G06N 20/00* (2019.01); *G06T 7/0002* (2013.01); *G06T 2207/20076* (2013.01); *G06T 2207/20081* (2013.01); *G06T 2207/20084* (2013.01); *G06T 2207/30168* (2013.01)

(58) Field of Classification Search
CPC ......... G06T 1/20; G06T 7/0002; G06N 20/00; G06N 3/08; G06F 17/18
See application file for complete search history.

(56) References Cited

U.S. PATENT DOCUMENTS

| | | | |
|---|---|---|---|
| 2002/0181023 A1* | 12/2002 | Gorian ................. | H04N 1/4053 358/3.05 |
| 2019/0266485 A1* | 8/2019 | Singh .................... | G06N 3/0454 |
| 2020/0126186 A1* | 4/2020 | Kim ...................... | H04N 19/117 |
| 2021/0150660 A1* | 5/2021 | An .......................... | G06T 1/20 |

FOREIGN PATENT DOCUMENTS

| | | | |
|---|---|---|---|
| JP | 2006020147 A | * | 1/2006 |
| KR | 10-2019-0091858 A | | 8/2019 |

* cited by examiner

*Primary Examiner* — Todd Buttram
(74) *Attorney, Agent, or Firm* — Birch, Stewart, Kolasch & Birch, LLP (57) ABSTRACT

Disclosed is a method and device for image processing. The image processing device may include a processor and a controller. The processor may include an artificial intelligence (AI) image processing model trained in image processing through learning, and an arithmetic logic unit (ALU) configured to perform a computation involved in image processing using the AI image processing model. According to the present disclosure, image processing using a deep neural network (DNN) is possible in an edge device.

10 Claims, 6 Drawing Sheets

METHOD AND DEVICE FOR IMAGE PROCESSING

CROSS-REFERENCE TO RELATED APPLICATION

Pursuant to 35 U.S.C. § 119(a), this application claims the benefit of an earlier filing date of and the right of priority to Korean Application No. 10-2019-0145803, entitled "Method and device for processing image," filed in Korea on Nov. 14, 2019, the contents of which are incorporated by reference herein in their entirety.

BACKGROUND

1. Technical Field

The present disclosure relates to a method and device for image processing. More specifically, the present disclosure relates to a method and device for processing sensing data received from an image sensor by using an artificial intelligence (AI) algorithm.

2. Description of Related Art

CCD image sensors have an advantage of lower noise in comparison to CMOS image sensors. Conversely, CMOS image sensors are cost-competitive because a CMOS manufacturing process is used in a manner of converting a signal into a voltage form and transmitting the converted signal.

Due to such features, CCD image sensors are used for digital cameras, and CMOS image sensors are mainly used for mobile devices. However, with the expansion of a market for mobile devices loaded with camera functions, such as mobile phones and tablet PCs, CMOS image sensors have starting to receive attention as vital components. In particular, since it is important to reduce power consumption with respect to mobile devices, CMOS image sensors with relatively low power consumption are suitable for the mobile devices.

However, CMOS image sensors, which photograph images at a lower quality compared to CCD image sensors, have a limitation in processing an image photographed in an ultra-low illuminance environment, despite the advancement of ISP technology in processing image data.

Artificial intelligence (AI) semiconductors have evolved to be advantageous in efficiently processing a large amount of data. Existing semiconductors are cheaper and more versatile, but they could not keep up with market flow due to low AI computation performance and power consumption efficiency. Accordingly, a first-generation AI semiconductor with high AI computation performance and power consumption efficiency has emerged, but the first-generation AI semiconductor is expensive and less versatile. As AI is required in various fields such as Internet of Things (IoT), intelligent robots, and smart cars, AI semiconductors also have emerged as non-von-neumann-based neuromorphic semiconductors that mimic a human brain.

Related Art discloses a heterogeneous processor architecture for integrating a convolutional neural network (CNN) and a recurrent neural network (RNN) into a single high-performance, low-power chip in a neural network processor architecture. However, aside from a CNN operator and an RNN operator sharing a memory and a computation controller, this related art is merely a simple combination of the CNN and the RNN.

SUMMARY OF THE INVENTION

The present disclosure is directed to addressing the issue associated with the related art which is merely a simple combination of artificial intelligence (AI) models.

The present disclosure is further directed to addressing the issue associated with the related art which relates to a correction method using a filter, the correction method having a limitation in processing an image photographed in an ultra-low illuminance environment.

The present disclosure is further directed to enhancing advantages of low power and miniaturization, and providing a method and device capable of processing an image in a hybrid manner according to a quality of the image.

While this disclosure includes specific embodiments, it will be apparent to one of ordinary skill in the art that various changes in form and details may be made in these embodiments without departing from the spirit and scope of claims and their equivalents. The embodiments described herein are to be considered in a descriptive sense only, and not for purposes of limitation. Further, it is understood that the objects and advantages of the present disclosure may be embodied by the means and a combination thereof in claims.

An image processing device according to an embodiment of the present disclosure may include a processor configured to process sensing data received from an image sensor, and a controller configured to control the processor. The processor may include an artificial intelligence (AI) image processing model trained in image processing through learning, and an arithmetic logic unit (ALU) configured to perform computation involved in image processing using the AI image processing model.

Further, the processor may be configured to further include an image signal processor (ISP) configured to process an image by using an image processing filter. The controller may control the processor such that at least one device among the ALU and the ISP processes the sensing data.

Further, the controller may analyze the sensing data to select the at least one device among the ALU and the ISP based on a quality of the sensing data.

Further, the image processing device may be configured to further include an image sensor configured to generate the sensing data by converting light into an electrical signal.

Further, the controller may be configured to include a data analyzer configured to analyze at least one type of data among the sensing data and pixel data processed by the processor.

Further, the data analyzer may statistically analyze the at least one type of data.

Further, the controller may be configured to further include an image quality assessor configured to assess the quality of data by using results of analyzing the at least one type of data.

Further, the controller may be configured to include a data analyzer configured to analyze data to assess at least one factor among distribution, illuminance, brightness, noise, and sharpness of at least one data among the sensing data and pixel data processed by the processor.

Further, the controller may assess illuminance among factors related to the quality of the data, and control a device that is selected according to a range of the illuminance.

Further, the controller may assess noise among factors related to the quality of the data, and control a device that is selected according to a range of the noise.

Further, the controller may assess sharpness among factors related to the quality of the data, and control a device that is selected according to a range of the sharpness.

Further, the processor may, as an AI image processing model, be configured to include a convolutional neural network (CNN) configured to generate a feature map to analyze the sensing data, as the AI image processing model.

Further, the ALU may be at least one of a graphics processing unit (GPU), a field-programmable gate array (FPGA), an application specific integrated circuit (ASIC), or a neuromorphic chip.

In order to solve the above-described issues, an image processing method according to another embodiment of the present disclosure may include analyzing sensing data received from an image sensor, assessing an image quality by using a result of analyzing data, selecting a processing device to process the sensing data according to the image quality, and processing an image by using the selected processing device.

Further, the selecting the processing device may use an AI image processing model when image brightness of the sensing data is less than or equal to a threshold value as shown in the formula below, and may otherwise use a pipeline-based ISP.

$$\frac{1}{N}\sum_{i,j} I(i, j) < \tau_A$$

Here, N is the total number of pixels in a target area, and I (i, j) is a pixel value at pixel position (i, j).

According to the present disclosure, the image may be processed in a hybrid manner according to the quality of the image.

Further, by using hybrid-based image processing, the quality of the image photographed in the ultra-low illuminance environment may be improved.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

The embodiments disclosed in the present specification will be described in greater detail with reference to the accompanying drawings, and throughout the accompanying drawings, the same reference numerals are used to designate the same or similar components and redundant descriptions thereof are omitted. As used herein, the terms "module" and "unit" used to refer to components are used interchangeably in consideration of convenience of explanation, and thus, the terms per se should not be considered as having different meanings or functions. In relation to describing the present disclosure, when the detailed description of the relevant known technology is determined to unnecessarily obscure the gist of the present disclosure, the detailed description may be omitted. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

An image processing device 100 according to an embodiment of the present disclosure is characterized by processing sensing data received from an image sensor, that is, a raw image, by using an artificial intelligence (AI) algorithm. Hereinafter, the AI algorithm related to the image processing device 100 will be described.

AI is one field of computer science and information technology that studies methods to make computers mimic intelligent human behaviors such as reasoning, learning, self-improving and the like.

In addition, the AI does not exist on its own, but is rather directly or indirectly related to a number of other fields in computer science. In recent years, there have been numerous attempts to introduce an element of the AI into various fields of information technology to solve problems in the respective fields.

Machine learning is an area of AI that includes the field of study that gives computers the capability to learn without being explicitly programmed.

Specifically, the machine learning may be a technology for researching and constructing a system for learning, predicting, and improving its own performance based on empirical data and an algorithm for the same. The algorithms of the machine learning may take a method of constructing a specific model in order to obtain the prediction or the determination based on the input data, rather than performing the strictly defined static program instructions.

Numerous machine learning algorithms have been developed for data classification in machine learning. Representative examples of such machine learning algorithms for data classification may include a decision tree, a Bayesian network, a support vector machine (SVM), an artificial neural network (ANN), and the like.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining through unsupervised learning.

SVM may include a supervised learning model for pattern detection and data analysis, heavily used in classification and regression analysis.

An ANN is a data processing system modelled after the mechanism of biological neurons and interneuron connections, in which a number of neurons, referred to as nodes or processing elements, are interconnected in layers.

ANNs are models used in machine learning, and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network can include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

A general single-layer neural network may be composed of an input layer and an output layer.

In addition, a general multi-layer neural network may be composed of an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

A deep neural network with a plurality of hidden layers between the input layer and the output layer may be the most representative type of ANN which enables deep learning, which is one machine learning technique.

An ANN can be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An ANN trained using training data can classify or cluster inputted data according to a pattern within the inputted data.

Throughout the present specification, an ANN trained using training data may be referred to as a trained model.

Hereinbelow, learning paradigms of an artificial neural network will be described in detail.

Learning paradigms of an ANN may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the ANN when the training data is inputted to the ANN.

Throughout the present specification, the target answer (or a result value) to be guessed by the ANN when the training data is inputted may be referred to as a label or labeling data.

In addition, throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning may be a machine learning method that learns from training data that has not been given a label.

More specifically, unsupervised learning may be a training scheme that trains an ANN to discover a pattern within given training data and perform classification by using the discovered pattern, rather than by using a correlation between given training data and labels corresponding to the given training data.

Examples of unsupervised learning may include, but are not limited to, clustering and independent component analysis.

Examples of ANNs using unsupervised learning may include, but are not limited to, a generative adversarial network (GAN) and an auto-encoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator receives and learns from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data may be reduced, thus leading to data compression or encoding.

Furthermore, the data outputted from the hidden layer may be inputted to the output layer. Given that the number of nodes in the output layer is greater than the number of nodes in the hidden layer, the dimensionality of the data may increase, thus leading to data decompression or decoding.

Furthermore, in the AE, the inputted data may be represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves inferring the label of unlabeled training data, and then using this inferred label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

The MDP may consist of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An ANN is characterized by features of its model, the features including an activation function, a loss function or cost function, a learning algorithm, an optimization algorithm, and the like. Also, the hyperparameters may be set before learning, and model parameters may be set through learning to specify the architecture of the ANN.

For example, the structure of an ANN may be determined by a number of factors, including the number of hidden layers, the number of hidden nodes included in each hidden layer, input feature vectors, target feature vectors, and the like.

Hyperparameters may include various parameters which need to be initially set for learning, much like the initial values of model parameters. Also, the model parameters may include various parameters sought to be determined through learning.

For example, the hyperparameters may include initial values of weights and biases between nodes, mini-batch size, iteration number, learning rate, and the like. Furthermore, the model parameters may include a weight between nodes, a bias between nodes, and the like.

Loss function may be used as an index (reference) in determining an optimal model parameter during the learning process of an ANN. Learning in the ANN may involve a process of adjusting model parameters so as to reduce the loss function, and the purpose of learning may be to determine the model parameters that minimize the loss function.

Loss functions may typically use means squared error (MSE) or cross entropy error (CEE), but the present disclosure is not limited thereto.

CEE may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms may include gradient descent (GD), stochastic gradient descent (SGD), momentum, Nesterov accelerate gradient (NAG), Adagrad, AdaDelta, RMSProp, Adam, and Nadam.

GD may include a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD may obtain a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size. In SGD, a momentum and NAG may be methods for increasing optimization accuracy by adjusting a step direction. The Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an ANN may rely not only on the structure and learning optimization algorithms of an ANN but also on the hyperparameters thereof. Therefore, in order to obtain a good learning model, it is important to choose a proper structure and learning algorithms for an ANN, but also to choose proper hyperparameters.

In general, the ANN may be first trained by experimentally setting hyperparameters to various values, and based on the results of training, the hyperparameters may be set to optimal values that provide a stable learning rate and accuracy.

Furthermore, the image processing device 100 may re-train the AI model, which is trained by the learning device 200, using personal data of a user on the basis of a transfer learning method. The image processing device 100 may use various AI application programs, provided by the learning device, 200 during a process of re-training or executing the AI model.

According to an embodiment of the present disclosure, two methods may be used as a deep-learning-based object recognition method. According to one of the methods, a deep learning model may be newly trained, and according to the other method, a pre-trained deep learning model may be used.

Basic training of a deep learning model, i.e., training of a deep network, requires a process of learning features and completing a model by collecting a large amount of label-designated training data sets and designing a network architecture. Excellent results can be obtained by the training of the deep network, but this approach requires vast training data sets and setting of layers and weights in the used network, for example, CNN.

A plurality of deep learning application programs used in a pre-trained deep learning model may use the transfer learning method, which is a process including a method of minutely adjusting a pre-trained model. In this transfer learning method, new data including a previously unknown class may be injected into the deep network by using an existing network such as AlexNet or GoogLeNet.

According to the transfer learning method, pre-training a model with thousands or millions of images may save time and quickly produce results.

The deep learning model may provide a high level of precision in terms of the analysis of sensing data, however for accurate analysis, large training data sets, that is, sensing data of varying quality, may be required.

The image processing device 100 according to an embodiment of the present disclosure, which is one of the deep learning models, may use a CNN model trained with analyzed sensing data and extracted features of an image. The CNN may analyze the sensing data by classifying the extracted features into unique categories.

Sensing data analysis may include manually extracting features and classifying the extracted features. For example, a HOG feature extraction method using a SVM learning algorithm may be used in an embodiment of the present disclosure. Other feature extraction algorithms, such as Harris corner, Shi & Tomasi, SIFT-DoG, FAST, AGAST, and major invariant feature (SURF, BRIEF, ORB) methods, may be used.

The AI image processing model according to an embodiment of the present disclosure may be transmitted to and stored in the image processing device 100 corresponding to an edge device, after being trained by the learning device 200. The learning device 200 will be described in more detail below.

Figure 1:
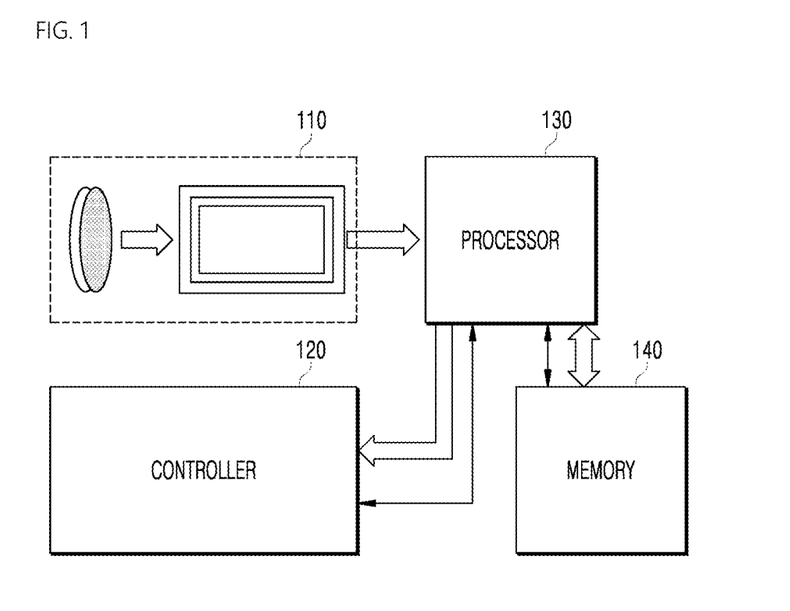
FIG. 1 is a block diagram of an image processing device according to an embodiment of the present disclosure.

FIG. 1 is a block diagram of an image processing device according to an embodiment of the present disclosure.

Referring to FIG. 1, illustrated is the image processing device 100 configured to include an image sensor 110, a controller 120, a processor 130, and a memory 140.

The image sensor 110 may function to convert light energy into electrical energy. The front and back of the image sensor 110 may be provided with various filters, for example, an RGB color filter. The image sensor 110 may be implemented using a CCD image sensor or a CMOS image sensor. The CCD image sensor may be mainly used for a digital camera, and the CMOS image sensor may be mainly used for various terminals. The image sensor 110 according to the present disclosure is not limited to any one type of image sensor.

The CMOS image sensor may have advantages of low cost and low power in comparison to the CCD image sensor. However, despite the advancement of ISP processing technology, an image photographed in an ultra-low illuminance environment may have shot noise due to lack of an absolute quantity of photons, which are components of light. Further, under ultra-low illuminance, there may be limitations in existing ISPs in relation to noise cancellation and image brightness correction. In an embodiment of the present disclosure, the processor 130 may process the image photographed in the ultra-low illuminance environment by using the AI image processing model trained beyond the limitation of image processing by an existing filter.

Figure 2:
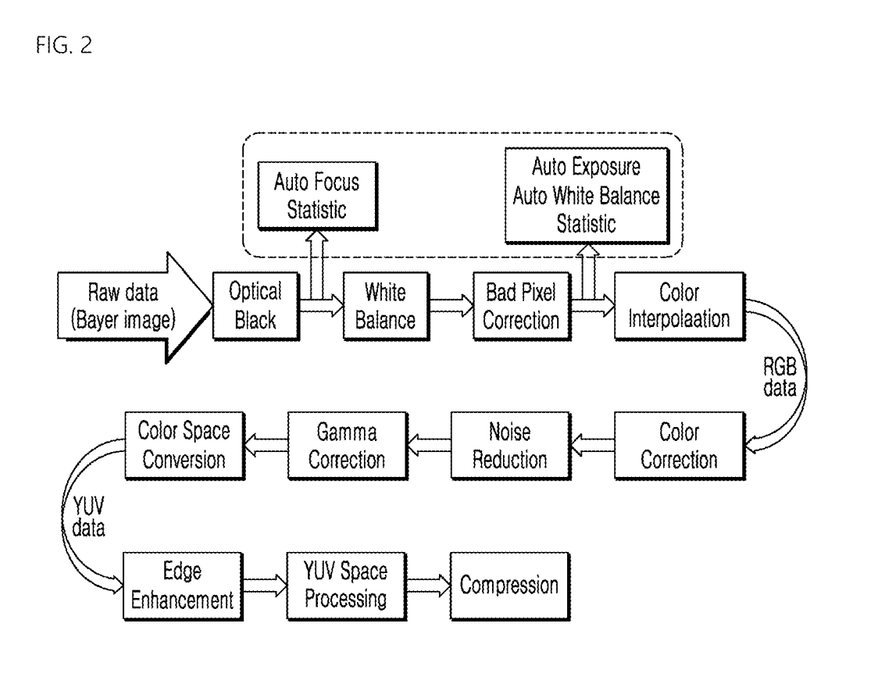
FIG. 2 is an exemplary diagram of image processing according to an embodiment of the present disclosure.

FIG. 2 is an exemplary diagram of image processing according to an embodiment of the present disclosure.

Referring to FIG. 2, an example is illustrated of an image processing process performed by the image processing device 100 according to an embodiment of the present disclosure.

The image sensor 110 may generate sensing data by amplifying an analog signal inputted through various filters such as the RGB color filter, and converting the analog signal such as in converting the analog into digital. The sensing data may be transmitted to the processor 130 for image processing. The sensing data transmitted to the processor 130 may be converted into pixel data through the image processing process, and the pixel data may be transmitted to the controller 120 for data analysis and quality assessment. The processor 130 may process an image stored in the memory 140. The memory 14 may be configured to include a volatile memory, for example, DRAM, and a nonvolatile memory, for example, FLASH RAM.

The image processing process according to an embodiment of the present disclosure may be configured to include at least one process of optimal black image adjustment, white balance adjustment, bad pixel correction, color interpolation, color space conversion, gamma correction, noise reduction, color correction, edge enhancement, YUV space processing, and compression. In the image processing process, the controller 120 may detect auto-focus statistic, auto-exposure, and auto-white balance statistic. The controller 120 may control various filters of the image sensor 110, and a generation process of sensing data of the CMOS or CCD image sensor through control signal transmission, and may control the image processing process of the processor 130 through communication with the processor 130. A command set for controlling the image sensor 110 and the processor 130 may be stored inside or outside the controller 120 in the form of software or hardware, and upgraded.

The controller 120 may control the processor to process at least one type of data (hereinafter, data) among the sensing data and the pixel data. That is, the controller 120 may analyze the data, and may assess a quality of the image by using an analysis result. The controller 120 may select, based on a quality of the data, at least one among devices suitable for data processing, such as an ALU included in an ISP suitable for the AI algorithm and a pipeline-based ISP or ALU that performs a computation related to an image processing filter, and may control the image processing process using the selected device.

The sensing data may refer to raw image data received from the image sensor 110, and the pixel data may refer to image data resulting from an intermediate or final result of the image processing process.

Figure 3:
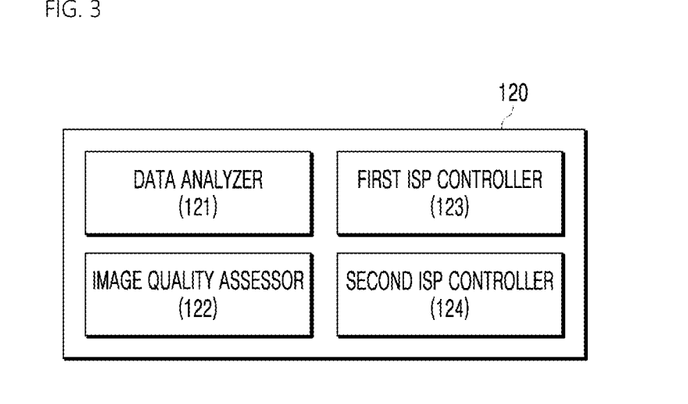
FIG. 3 is a block diagram of a controller according to an embodiment of the present disclosure.

FIG. 3 is a block diagram of a controller according to an embodiment of the present disclosure.

Referring to FIG. 3, the controller 120 may be configured to include a data analyzer 121, an image quality assessor 122, a first ISP controller 123, and a second ISP controller 124.

The data analyzer 121 may analyze at least one type of data among the sensing data and the pixel data processed by the processor 130. Here, the data analyzer 121 may statistically analyze the at least one type of data. Statistical analysis may refer to analysis using various charts, for example, histograms, based on pixel data values.

The data analyzer 121 may be configured to include functional blocks that respectively analyze features of the image, for example, distribution of the image, brightness of the image, noise of the image, and sharpness of the image. Through the respective functional blocks, the data analyzer 121 may generate histograms or a global or local average value, a median value, a maximum value, a minimum value, and the like with respect to image brightness. Further, the data analyzer 121 may calculate a standard deviation of noise with respect to noise analysis. Furthermore, the data analyzer 121 may calculate a gradient value with respect to noise analysis of the image.

The image quality assessor 122 may assess a quality of data by using a result of analyzing at least one type of data among the sensing data and the pixel data. Image quality related to data quality may include, for example, pixel distribution, brightness, illuminance, noise distribution, and sharpness of an image.

The image quality assessor 122 may assess, by using the analysis result by the data analyzer 121, whether an image to be analyzed is low in brightness, high in noise, or low in sharpness, due to ultra-low illuminance.

For example, when a brightness value of a target image is less than or equal to a particular threshold value, the first ISP may be selected, otherwise the second ISP may be selected. Here, a brightness value of the image may be a value related to pixel distribution and luminance. The brightness value of the image may be assessed in the entire image area or a particular image area. The preceding may be represented as Equation 1 described in the following.

$$\frac{1}{N} \sum_{i,j} I(i, j) < \tau_A \qquad \text{Equation 1}$$

Here, N is the total number of pixels in a target area, and (,) is a pixel value at pixel location (,). The image may be a raw input image or an image for each of R, G, and B channels obtained by performing simple interpolation, for example, bilinear interpolation. Further, $\tau\_A$ may be a threshold value.

For example, when a noise value of an input image is greater than or equal to a particular threshold value, the first ISP based on the DNN may be selected, otherwise the second ISP based on the existing method may be selected. An image with very small brightness value may include a lot of noise. An ISO value may be very high depending on the image sensor, or noise occurrence may increase as the exposure time becomes longer.

For example, when an extent of blur in the input image is greater than or equal to a particular threshold value, the first ISP based on the DNN may be selected, or the second ISP based on the existing method may otherwise be selected. When an object moves faster than an exposure time of a camera, motion blur may likely occur. When the exposure time is set to be very long, that is, blurring may occur under low illuminance, which may lead to the lower sharpness of the image.

The first ISP controller 123 may function to control the first ISP related to the AI algorithm, for example, the first ISP based on the DNN. The first ISP controller may determine a value of an adaptive tuning factor required for the first ISP based on the DNN.

The second ISP controller 124 may function to control the second ISP unrelated to the AI algorithm, for example, the second ISP based on a pipeline using an image processing filter. The second ISP may generate a tuning factor of the existing pipeline-based first ISP to be at a level suitable for image quality.

The processor 130 may perform a computation required for processing the sensing data received from the image sensor 110 according to a control command of the controller 120.

The processor 130 may be configured to include an AI image processing model trained in image processing through learning, and an arithmetic logic unit (ALU) that performs a computation involved in image processing using the AI image processing model.

Specifically, the processor 130 may be configured to include the first ISP and the second ISP. The first ISP may refer to an ISP that includes the AI algorithm, for example, the DNN, and operates according to the DNN, and the second ISP may refer to an ISP that operates according to a program, for example, the image processing filter.

Therefore, the first ISP may be configured to include an ALU having a structure suitable for performing a computation involved in image processing using the DNN. The second ISP may be configured to include an ALU based on the pipeline suitable for a program operation.

The memory 140 may store unprocessed sensing data, for example, a raw image, and processed pixel data, and may be loaded with the AI image processing model and a user application program for correcting an image photographed by an image sensor.

The controller 120 may determine an ISP to process sensing data through data analysis and an image quality assessment process. That is, the controller 120 may determine an ISP to process data according to image quality through image collection and data analysis by the data analyzer 121, and image quality assessment based on the data analysis by the image quality assessor 122.

Figure 4:
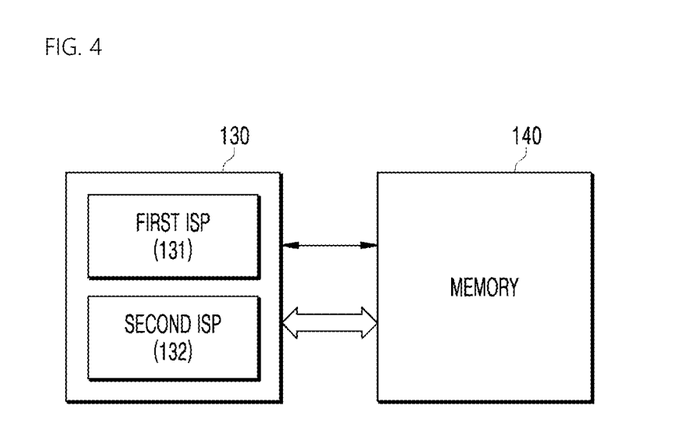
FIG. 4 is a block diagram of a processor according to an embodiment of the present disclosure.

FIG. 4 is a block diagram of a processor according to an embodiment of the present disclosure.

Referring to FIG. 4, the processor 130 may be configured to include the first ISP 131 and the second ISP 132. FIG. 4 illustrates a type of ISP which may be provided in the processor 130, and the processor 130 may be configured to include a plurality of ISPs.

The first ISP 131 may be an ISP related to the AI algorithm. The first ISP 131 may be configured to include the AI model corresponding to a product of the AI algorithm, for example, the DNN. The DNN may be implemented in the form of software or hardware. A DNN that is in the form of software may be implemented in the form of being stored in a nonvolatile memory of the first ISP, for example, a flash memory. A DNN that is in the form of hardware may be implemented in the form of a field-programmable gate array (FPGA) which is modifiable after being manufactured. In addition, the first ISP may be implemented in the form of a neuromorphic chip including artificial neurons and artificial synapses which perform learning and reasoning.

The second ISP 132 may be an ISP disrelated to the AI algorithm. The second ISP may be a von-neumann-based ISP. The pipeline-based ISP may also be included in the category of the first ISP.

The processor 130 may process the sensing data and the pixel data under the control of the controller 120. In addition, the processor 130 may perform a computation through various programs for computers stored in the memory 140, for example, applications.

Figure 5:
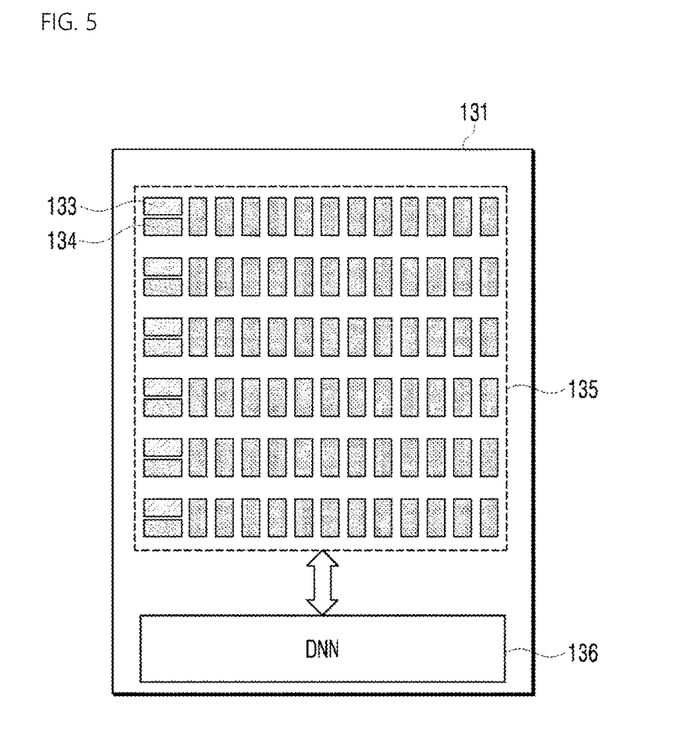
FIG. 5 is a block diagram of a first ISP according to an embodiment of the present disclosure.

FIG. 5 is a block diagram of a first ISP according to an embodiment of the present disclosure.

Referring to FIG. 5, the first ISP 131 may be configured to include an ALU 133, a cache memory 134, a DNN, and an ISP controller 136.

According to the AI algorithm called deep learning, learning may occur in multiple neurons at the same time, and information learned at the same time may be memorized. This is because nerve cells are connected to each other in parallel. In the AI algorithm, millions or hundreds of millions of tasks may need to be performed in parallel. When the tasks are performed in series, a lot of time may be taken up with a delay. Such delay may be called non-neumann bottleneck. The first ISP may be implemented in the form of a neuromorphic chip that is one of AI semiconductors. The first ISP may be implemented using a silicon semiconductor as a brain-level parallel computing system. For example, a neuron 137 that is a nerve cell, a synapse 138 that connects neurons, and a transceiver 139 may be implemented to be distributed through a transistor circuit and a memory device.

Figure 6:
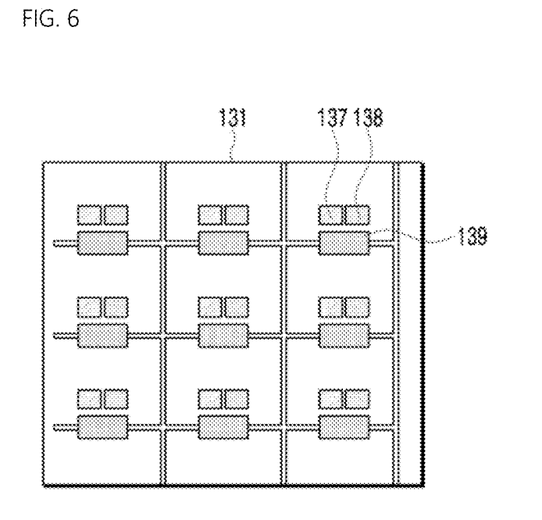
FIG. 6 is a block diagram of a first ISP according to an embodiment of the present disclosure.

FIG. 6 is a block diagram of a first ISP according to an embodiment of the present disclosure.

Referring to FIGS. 5 and 6, when the ALU that performs a computation and the DNN that performs learning are separated from each other in the first ISP illustrated in FIG. 5, a computing and learning process may be implemented through the neuron 137 corresponding to the neural cell and the synapse 138 in the first ISP illustrated in FIG. 6.

Figure 7:
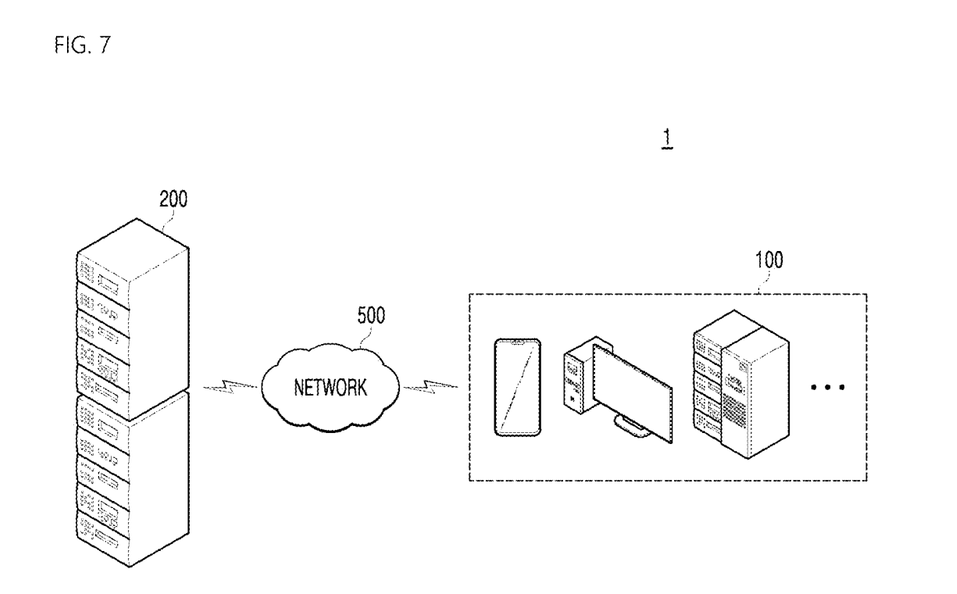
FIG. 7 is an exemplary diagram of a network environment to which an image processing device is connected according to an embodiment of the present disclosure.

FIG. 7 is an exemplary diagram of a network environment to which an image processing device is connected according to an embodiment of the present disclosure.

Referring to FIG. 7, there is illustrated a network environment 1 including various types of image processing devices 100, the learning device 200, and a network 500 that connects the image processing device 100 and the learning device 200 each other through communication.

The image processing device 100 may be referred to as a cloud of the learning device 200 as an edge device in relation to learning of the AI model and reasoning based thereon. A learning process of the AI model may be mainly performed by the cloud, and a reasoning process may be performed by both the learning device 200 and the image processing device 100.

When compared to the past, where both learning and reasoning were performed by the cloud, the image processing device 100 according to an embodiment of the present disclosure may include within an AI algorithm, for example, at least one learned DNN, and an ALU that is suitable for three-dimensional operation performed by the DNN, thereby directly performing learning-based reasoning.

The network 500 may be an appropriate communication network including wired and wireless networks, such as a local area network (LAN), a wide area network (WAN), the Internet, the Intranet, and the extranet and a mobile network such as cellular, 3G, LTE, 5G, a Wi-Fi network, an AD hoc network, and a combination thereof.

The network 500 may include connection of network elements such as a hub, a bridge, a router, a switch, and a gateway. The network 500 may include one or more connected networks including a public network such as the Internet and a private network such as a secure corporate private network, for example, multiple network environments. Access to the network 500 may be provided via one or more wired or wireless access networks.

The image processing device 100 may transmit and receive data with a learning device 200 which is a learning device, through a 5G network. Specifically, the image processing device 100 implemented in the form of a terminal may perform data communication with the learning device 200 using at least one service of enhanced mobile broadband (eMBB), ultra-reliable and low latency communications (URLLC), and massive machine-type communications (mMTC) through the 5G network.

The eMBB may be a mobile broadband service, and may provide, for example, multimedia contents and wireless data access. In addition, more improved mobile services such as a hotspot and a wideband coverage for receiving mobile traffic that are tremendously increasing may be provided through the eMBB. Through a hotspot, high-volume traffic may be accommodated in an area where user mobility is low and user density is high. A wide and stable wireless environment and user mobility may be secured by a wideband coverage.

The URLLC service may define requirements that are far more stringent than existing LTE in terms of reliability and transmission delay of data transmission and reception, and may correspond to a 5G service for production process automation in fields such as industrial fields, telemedicine, remote surgery, transportation, safety, and the like.

The mMTC (massive machine-type communications) may be a service that is not sensitive to transmission delay requiring a relatively small amount of data transmission. The mMTC may enable a much larger number of terminals, such as sensors, than general mobile cellular phones to be simultaneously connected to a wireless access network. In this case, the price of the communication module of a terminal should be low and a technology improved to increase power efficiency and save power may be required to enable operation for several years without replacing or recharging a battery.

Figure 8:
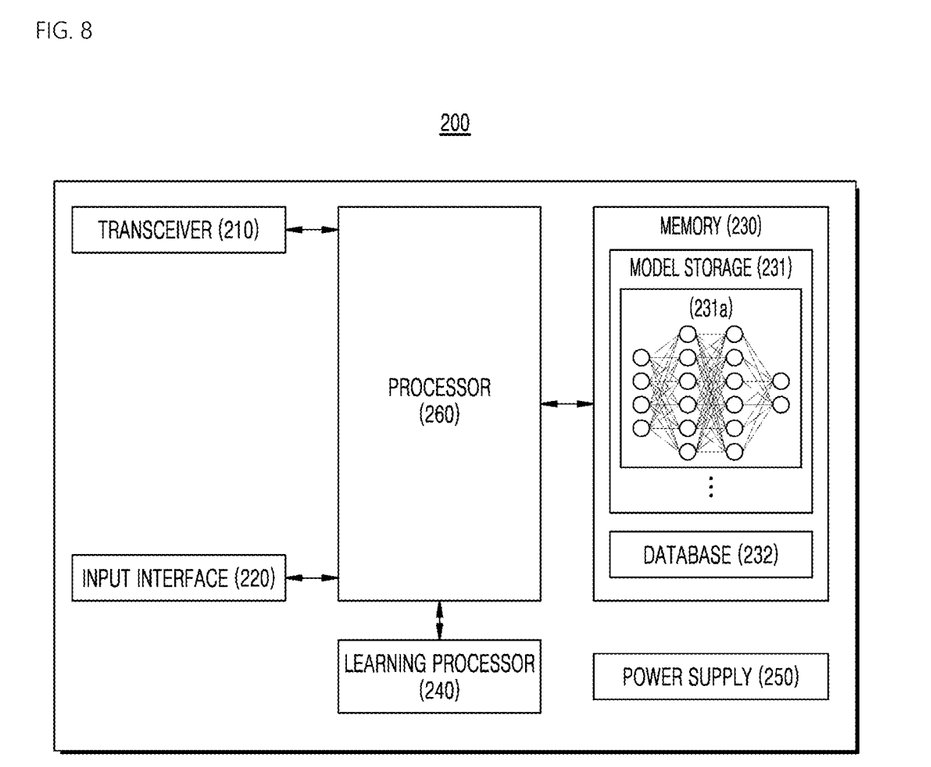
FIG. 8 is a block diagram of a learning device of an artificial intelligence (AI) model according to an embodiment of the present disclosure.

FIG. 8 is a block diagram of a learning device of an AI model according to an embodiment of the present disclosure.

The learning device 200 may be a device or server constructed separately outside the image processing device 100, and may perform a function of training the AI model included in the first ISP 131 of the image processing device 100 through learning of image processing.

That is, the learning device 200 may be configured to receive, classify, store, and output information to be used for data mining, data analysis, intelligent decision making, and machine learning algorithms. Here, the machine learning algorithm may include a deep learning algorithm.

The learning device 200 may communicate with at least one image processing device 100 and derive a result by analyzing or learning the data on behalf of the image processing device 100. Here, the meaning of "on behalf of the other device" may be distribution of a computing power by means of distributed processing.

The learning device 200 of the ANN is various devices for learning an ANN and normally, refers to a server, and also referred to as a learning device or a learning server.

Specifically, the learning device 200 may be implemented not only by a single server, but also by a plurality of server sets, a cloud server, or a combination thereof.

That is, the learning device 200 may be configured as a plurality of learning devices to configure a learning device set (or a cloud server) and at least one learning device 200 included in the learning device set may derive a result by analyzing or learning the data through the distributed processing.

The learning device 200 may transmit a model trained by the machine learning or the deep learning to the image processing device 100 periodically or upon the request.

Referring to FIG. 8, the learning device 200 may include, for example, a transceiver 210, an input interface 220, a memory 230, a learning processor 240, a power supply 250, and a processor 260.

The transceiver 210 may transmit and receive data to and from other devices through wired and wireless communication or an interface.

The input interface 220 may obtain data by receiving data through the transceiver 210.

The input interface 220 may obtain input data for acquiring an output using training data for model learning and a trained model.

The input interface 220 may obtain input data which is not processed, and, in this case, the processor 260 may pre-process the obtained data to generate training data to be inputted to the model learning or pre-processed input data.

In this case, the pre-processing on the input data performed by the input interface 220 may refer to extracting of an input feature from the input data.

The memory 230 may include a model storage 231, a database 232, and the like.

The storage memory 231 may store a model (or an ANN 231a) which learns or is trained through the learning processor 240, and when the model is updated through the learning, stores the updated model.

If necessary, the model storage 231 may store the trained model by dividing the model into a plurality of versions depending on a training timing or a training progress.

The ANN 231a illustrated in FIG. 8 is one example of ANNs including a plurality of hidden layers, but the ANN of the present disclosure is not limited thereto.

The ANN 231a may be implemented by hardware, software, or a combination of hardware and software. When a part or all of the ANN 231a is implemented by the software, one or more commands which configure the ANN 231a may be stored in the memory 230.

The database 232 may store input data obtained from the input interface 220, learning data (or training data) used to learn a model, a learning history of the model, and the like.

The input data stored in the database 232 may be not only data which is processed to be suitable for the model learning but also input data itself which is not processed.

The learning processor 240 may train (or learn) the ANN 231a using training data or a training set.

The learning processor 240 may immediately obtain data which is obtained by pre-processing input data obtained by the processor 260 through the input interface 220 to learn the ANN 231a or obtain the pre-processed input data stored in the database 232 to learn the ANN 231a.

Specifically, the learning processor 240 repeatedly may train the ANN 231a using various learning techniques described above to determine optimized model parameters of the ANN 231a.

In this specification, the ANN which is trained using training data to determine parameters may be referred to as a learning model or a trained model.

In this case, the learning model may be loaded in the learning device 200 to deduce the result value or may be transmitted to the other device such as the image processing device 100 through the transceiver 210 to be loaded.

Further, when the learning model is updated, the updated learning model may be transmitted to the other device such as the image processing device 100 through the transceiver 210 to be loaded.

The power supply 250 may be a configuration corresponding to the power supply 190 of FIG. 1.

A redundant description for corresponding configurations will be omitted.

In addition, the learning device 200 may evaluate the AI model 231a, and may update the AI model 231a for better performance after the evaluation and provide the updated AI model 231a to the image processing device 100. Here, the image processing device 100 may perform a series of steps performed by the learning device 200 solely in a local area or together with the learning device 200 through the communication with the learning device 200. For example, by training the AI model 174 in a local area with the personal pattern of a user through secondary training that uses personal data of the user, the image processing device 100 may update the AI model 174 downloaded from the learning device 200.

Figure 9:
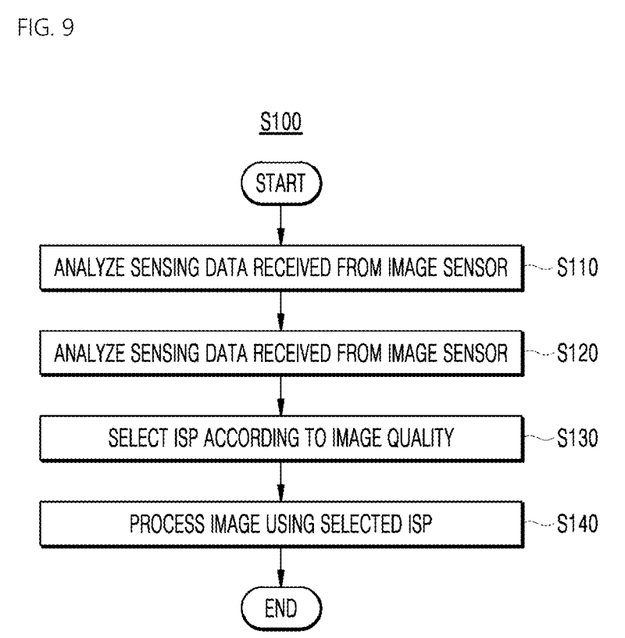
FIG. 9 is a flowchart of an image processing method according to an embodiment of the present disclosure.

FIG. 9 is a flowchart of an image processing method according to an embodiment of the present disclosure.

Referring to FIG. 9, an image processing method (S100) may be configured to include analyzing sensing data (S110), assessing image quality (S120), selecting an ISP (S130), and processing an image by using the selected ISP (S140). Hereinafter, the image processing method performed by the image processing device 100 will be described in detail.

The image processing device 100 may receive sensing data through the image sensor 110. The image processing device 100, implemented in the form of a personal communication terminal such as a smartphone or a tablet computer may basically include a camera, but a workstation, a server, and the like for image processing, may receive sensing data photographed and collected through the image sensor 110 from a data source.

First, the sensing data received from the image sensor may be analyzed (S110). A statistical image method may be used for image analysis. Based on the sensing data, that is, pixel values constituting a raw image, image analysis using a distribution of pixels may be performed by the image processing device 100.

Next, the image quality may be assessed using the data analysis result (S120). The image quality may be based on the image analysis. Factors which may be used to assess the image quality include, for example, image brightness, illuminance, noise, and sharpness. In an embodiment of the present disclosure, an image quality assessor may sort and separate sensing data collected in an ultra-low illuminance condition where a limitation of an existing pipeline-based ISP may occur, from that of other data.

Next, a processing device to process the sensing data according to the image quality, that is, an ISP, may be selected (S130). The ISP may include a first ISP including an AI image processing model, for example, a DNN, and an ALU having a structure suitable for a three-dimensional computation based on the DNN, for example, a matrix computation, and a second ISP based on the existing pipeline technology.

The selection of the ISP is not necessarily mutually exclusive. According to quality distribution of the image, the first ISP based on the AI algorithm may be selected and processed for an area having a pixel that is difficult to correct based on the existing method, and the second ISP based on the existing method may be selected and processed for an area having a pixel showing an image quality that is not very poor.

Finally, the image may be processed using the selected processing device (S140). A case where a result of processing an image is clearly divided according to whether the selected processing device is the first ISP or the second ISP may be a case where an image photographed in an ultra-low illuminance condition is processed. In the ultra-low illuminance condition, photon particles contained in light may be so utterly lacking that a low-brightness image and an image including noise resulting from irregular distribution of photons may be photographed.

The existing pipeline-based ISP, such as the second ISP 132, may read a program stored in a memory (fetch process), interpret a command included in the program (decoding process), perform a calculation according to the command (execution process), and finally store back a result of the calculation in the memory (storage process).

Conversely, the ISP suitable for the AI algorithm, such as the first ISP, may be at least of a graphics processing unit (GPU) suitable for parallel processing, a FPGA that may include the AI image processing model and update the stored AI image model using transfer learning, an application specific integrated circuit (ASIC) designed to perform a particular task using the AI algorithm, or a neuromorphic semiconductor in which an artificial neuron and a synapse implemented using a transistor perform a computation.

As such, according to an embodiment of the present disclosure, the image may be processed in a hybrid manner according to the quality of the image.

Further, by using hybrid-based image processing, the quality of the image photographed in the ultra-low illuminance environment may be improved.

The exemplary embodiments described above may be implemented through computer programs executable through various components on a computer, and such computer programs may be recorded in computer-readable media. In this case, examples of the computer-readable media may include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, and flash memory devices.

The computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

The singular forms "a," "an" and "the" in this present disclosure, in particular, claims, may be intended to include the plural forms as well. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims according to the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations may be made depending on design conditions and factors within the scope of the appended claims or equivalents thereof.

The present disclosure is thus not limited to the example embodiments described above, and rather intended to include the following appended claims, and all modifications, equivalents, and alternatives falling within the spirit and scope of the following claims.

DESCRIPTION OF SYMBOLS

110: Image sensor
120: Controller
121: Data analyzer
122: Image quality assessor
123: First ISP controller
124: Second ISP controller
130: Processor
131: First ISP
132: Second ISP
140: Memory

What is claimed is:

1. An image processing device comprising:
a processor configured to process sensing data received from an image sensor; and
a controller configured to control the processor,
wherein the processor comprises:
an artificial intelligence (AI) image processing model trained in image processing through learning;
an arithmetic logic unit (ALU) configured to perform a computation involved in image processing using the AI image processing model; and
an image signal processor (ISP) configured to process an image by using an image processing filter,
wherein the controller is configured to analyze the sensing data in order to select the at least one device among the ALU and the ISP based on a quality of the sensing data and control the processor so that at least one device selected among the ALU and the ISP processes the sensing data, wherein the controller comprise a data analyzer configured to analyze at least one type of data among the sensing data and pixel data processed by the processor, and an image quality assessor configured to assess a Quality of data by using a result of analyzing the at least one type of data, and wherein the controller assesses noise among factors related to the quality of the data, and controls a device that is selected according to a range of the noise.

2. The image processing device according to claim 1, further comprising an image sensor configured to generate the sensing data by converting light into an electrical signal.

3. The image processing device according to claim 1, wherein the data analyzer statistically analyzes the at least one type of data.

4. The image processing device according to claim 1, wherein the data analyzer is further configured to analyze data to assess at least one factor among distribution, illuminance, brightness, noise, and sharpness of at least one data among the sensing data and the pixel data processed by the processor.

5. The image processing device according to claim 1, wherein the controller assesses illuminance among factors related to the quality of the data, and controls a device that is selected according to a range of the illuminance.

6. The image processing device according to claim 1, wherein the processor comprises, as the AI image processing model, a convolutional neural network (CNN) configured to generate a feature map to analyze the sensing data.

7. The image processing device according to claim 6, wherein the ALU is at least one of a graphics processing unit (GPU), a field-programmable gate array (FPGA), an application specific integrated circuit (ASIC), or a neuromorphic chip.

8. An image processing device comprising:
a processor configured to process sensing data received from an image sensor; and
a controller configured to control the processor,
wherein the processor comprises:
an artificial intelligence (AI) image processing model trained in image processing through learning;
an arithmetic logic unit (ALU) configured to perform a computation involved in image processing using the AI image processing model; and
an image signal processor (ISP) configured to process an image by using an image processing filter,
wherein the controller is configured to analyze the sensing data in order to select the at least one device among the ALU and the ISP based on a quality of the sensing data and control the processor so that at least one device selected among the ALU and the ISP processes the sensing data, and wherein the controller assesses noise among factors related to the quality of the sensing data, and controls a device that is selected according to a range of the noise.

9. An image processing device comprising:
a processor configured to process sensing data received from an image sensor; and
a controller configured to control the processor,
wherein the processor comprises:
an artificial intelligence (AI) image processing model trained in image processing through learning;
an arithmetic logic unit (ALU) configured to perform a computation involved in image processing using the AI image processing model; and
an image signal processor (ISP) configured to process an image by using an image processing filter,
wherein the controller is configured to analyze the sensing data in order to select the at least one device among the ALU and the ISP based on a quality of the sensing data and control the processor so that at least one device selected among the ALU and the ISP processes the sensing data, and
wherein the controller assesses sharpness among factors related to the quality of the sensing data, and controls a device that is selected according to a range of the sharpness.

10. An image processing method performed by an image processing device, the image processing method comprising:
analyzing sensing data received from an image sensor;
assessing an image quality by using the analysis result;
selecting a processing device to process the sensing data according to the image quality; and
processing an image by using the selected processing device,
wherein in the selecting the processing device, the following equation is used:

$$\frac{1}{N}\sum_{i,j} I(i, j) < \tau_A$$

where N is the total number of pixels in a target area, and I (i, j) is a pixel value at pixel position (i, j), and
wherein an artificial intelligence (AI) image processing model is used in the case in which an image brightness value of the sensing data is less than or equal to a threshold value as shown in the equation above, otherwise a pipeline-based image signal processor (ISP) is used.

* * * * *